United States Patent
Kang et al.

(10) Patent No.: US 8,799,929 B2
(45) Date of Patent: Aug. 5, 2014

(54) METHOD AND APPARATUS FOR BANDWIDTH ALLOCATION MODE SWITCHING BASED ON RELATIVE PRIORITIES OF THE BANDWIDTH ALLOCATION MODES

(71) Applicant: Marvell World Trade Ltd., St. Michael (BB)

(72) Inventors: Jack Kang, Sunnyvale, CA (US); Yu-Chi Chuang, Jhubei (TW)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/863,163

(22) Filed: Apr. 15, 2013

(65) Prior Publication Data

US 2013/0247072 A1    Sep. 19, 2013

Related U.S. Application Data

(63) Continuation of application No. 13/279,163, filed on Oct. 21, 2011, now Pat. No. 8,424,021, which is a continuation of application No. 11/775,172, filed on Jul. 9, 2007, now Pat. No. 8,046,775.

(60) Provisional application No. 60/825,806, filed on Sep. 15, 2006, provisional application No. 60/822,342, filed on Aug. 14, 2006.

(51) Int. Cl.
*G06F 13/00* (2006.01)

(52) U.S. Cl.
USPC ............ 719/318; 718/102; 718/104; 712/244

(58) Field of Classification Search
USPC .................... 719/318; 718/102, 107; 712/244
See application file for complete search history.

(56) References Cited

U.S. PATENT DOCUMENTS

| | | | |
|---|---|---|---|
| 6,275,502 B1 * | 8/2001 | Arimilli | 370/468 |
| 6,295,600 B1 | 9/2001 | Parady | |
| 6,366,761 B1 | 4/2002 | Montpetit | |
| 6,662,297 B1 * | 12/2003 | Boom et al. | 712/245 |
| 6,801,997 B2 | 10/2004 | Joy et al. | |
| 6,823,516 B1 | 11/2004 | Cooper | |
| 7,107,363 B2 | 9/2006 | Brown et al. | |
| 7,213,084 B2 * | 5/2007 | Ogilvie et al. | 710/22 |
| 7,213,137 B2 | 5/2007 | Boom et al | |
| 7,360,064 B1 | 4/2008 | Steiss et al. | |
| 7,430,221 B1 | 9/2008 | Kovacs et al. | |
| 7,434,037 B2 | 10/2008 | Park et al. | |
| 7,472,393 B2 | 12/2008 | Ballantyne | |
| 7,564,872 B1 | 7/2009 | Chawla et al. | |
| 7,676,660 B2 | 3/2010 | Kissell | |

(Continued)

OTHER PUBLICATIONS

Matz, Kevin. "Calling Interrupts". 1997, pp. 1-7.

(Continued)

*Primary Examiner* — Andy Ho

(57) ABSTRACT

A system, apparatus, and method for allocation mode switching on an event-driven basis are described herein. The allocation mode switching method includes detecting an event, selecting a bandwidth allocation mode associated with the detected event, and allocating a plurality of execution cycles of an instruction execution period of a processor core among a plurality of instruction execution threads based at least in part on the selected bandwidth allocation mode. Other embodiments may be described and claimed.

18 Claims, 8 Drawing Sheets

(56) References Cited

U.S. PATENT DOCUMENTS

| | | |
|---|---|---|
| 7,694,304 B2 | 4/2010 | Kissell |
| 7,761,697 B1 | 7/2010 | Coon et al. |
| 2002/0103990 A1 | 8/2002 | Potash |
| 2003/0023835 A1 | 1/2003 | Kalafatis et al. |
| 2004/0073735 A1 | 4/2004 | Boom et al. |
| 2004/0148606 A1 | 7/2004 | Hosoe |
| 2004/0215720 A1 | 10/2004 | Alexander et al. |
| 2005/0050305 A1 | 3/2005 | Kissell |
| 2006/0179281 A1 | 8/2006 | Jensen et al. |
| 2006/0288190 A1 | 12/2006 | Shoemaker |
| 2007/0174372 A1 | 7/2007 | Feghali et al. |
| 2007/0204137 A1 | 8/2007 | Tran |
| 2008/0040730 A1 | 2/2008 | Kang et al. |
| 2008/0229068 A1 | 9/2008 | Bose et al. |
| 2012/0036518 A1 | 2/2012 | Kang et al. |

OTHER PUBLICATIONS

Steere et al., "A Feedback-driven Proportion Allocator for Real-Rate Scheduling". Proceedings of teh 3rd Symposium on Operating System Design and Implementation, New Orleans, Louisiana, Feb. 1999, pp. #1-pp. #15.

* cited by examiner

METHOD AND APPARATUS FOR BANDWIDTH ALLOCATION MODE SWITCHING BASED ON RELATIVE PRIORITIES OF THE BANDWIDTH ALLOCATION MODES

CROSS-REFERENCES TO RELATED APPLICATIONS

The present disclosure is a continuation of and claims priority to U.S. patent application Ser. No. 13/279,163, filed Oct. 21, 2011, now U.S. Pat. No. 8,424,021, issued Apr. 16, 2013, which is a continuation of U.S. patent application Ser. No. 11/775,172, filed Jul. 9, 2007, now U.S. Pat. No. 8,046,775, issued Oct. 25, 2011, which claims priority to U.S. Provisional Patent Application No. 60/825,806, filed Sep. 15, 2006, and U.S. Provisional Patent Application No. 60/822,342, filed Aug. 14, 2006, which are incorporated herein by reference.

TECHNICAL FIELD

Embodiments of the present invention relate to the field of data processing and, in particular, to techniques for event-based allocation mode switching in a multi-thread processing environment.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multi-thread processing by employing an operating system to manage hardware resource usage and thread switching. However, a significant performance penalty is incurred each time the processor changes threads. Additional inefficiency occurs in a single pipeline processor when a thread is initially allocated a block of execution cycles, but is unable to execute consecutive instructions as scheduled because necessary component data is unavailable.

More recently, techniques for processing multiple threads on a single processor core have been developed that reduce the penalty for thread switching. However, changing the allocation of processing cycles in such systems is performed through a processor issuing instructions to change the cycle count for each thread, which may present various challenges with respect to response time, precision, and predictability.

For example, changing cycle allocation could require up to one instruction per thread. As the master thread may be the only thread with the capability to change the cycle count, it may take many (potentially hundreds) of cycles before the master thread can finish reprogramming the cycles. Since multiple instructions may be required for changing the cycle allocation, and the instructions are not atomic (e.g., other threads may switch in while the master thread is changing the allocation), there may be rounds of imprecise allocation.

Also, it may be difficult for the software to know exactly when the cycle allocation needs to occur. In order to get feedback, polling or other feedback techniques may need to be employed. Additionally, due to challenges with response time and related to the non-atomic nature of the instructions, accurately simulating worst-case behavior may become problematic, thereby sacrificing predictability of the system.

SUMMARY OF THE INVENTION

In view of the challenges in the state of the art, embodiments of the invention are based on the technical problem of changing relative allocations of a plurality of execution cycles of an instruction period to multiple instruction threads. A processing system is also described, suitable to solve the problems which at least one embodiment of the invention is based on, with a scheduler providing event-based allocation mode switching.

More specifically, there is provided, in accordance with various embodiments of the invention, a method for detecting an event; selecting a bandwidth allocation mode associated with the detected event; and allocating a plurality of execution cycles of an instruction execution period of a processor core among a plurality of instruction execution threads based at least in part on the selected bandwidth allocation mode.

In accordance with a further mode of one embodiment of the invention, the detected event may be a hardware event on an allocation input of one or more allocation inputs of the processor core of the multi-threading processing environment.

In an embodiment, the selection of the bandwidth allocation mode may be done by reference to a register storing a bandwidth allocation table having one or more bandwidth allocation modes. Each of the one or more bandwidth allocation modes may also be associated with a respective allocation input.

In an embodiment, the methods may further include configuring a bandwidth allocation table with the bandwidth allocation modes, along with the associations between the modes and the allocation inputs, prior to the detected event. This may be done in an initial configuration of a processor's registers.

In an embodiment, the methods may further include detecting events on more than one allocation input and selecting bandwidth allocation modes based on relative priorities of the allocation modes associated with the detected events.

With various embodiments of the present invention there is provided a multi-threading processing environment including a scheduler to detect an event, select a bandwidth allocation mode associated with the detected event, and allocate a plurality of execution cycles of an instruction execution period among a plurality of instruction execution threads based at least in part on the selected bandwidth allocation mode.

This allocation may be provided by the scheduler to an instruction dispatcher of the processing environment, operatively coupled to the scheduler, which may fetch and issue instructions of the plurality of threads accordingly. These instructions may be issued to execution circuitry of the processing environment, which is operatively coupled to the instruction dispatcher, for processing.

In an embodiment, the processing environment may include a number of allocation inputs, e.g., pins, that may each be associated with a bandwidth allocation mode found in a bandwidth allocation table stored in a processor's registers.

In an embodiment, the environment may be provided by a processor and/or integrated circuit.

In an embodiment, the execution environment may include a detection means for detecting an event, a selection means for selecting a bandwidth allocation mode associated with the detected event; and an allocation means for allocating a plurality of execution cycles of an instruction period of a processor core among a plurality of instruction execution threads based at least in part on the selected bandwidth allocation mode. In an embodiment, detection means, selection means, and allocation means may collectively be embodied by a scheduling means, such as scheduler having control circuitry configured to provide such functions.

In an embodiment, the execution environment may also include an instruction dispatching means such as an instruction unit responsible for ensuring that instructions are properly decoded, fetched, queued, and dispatched for execution. The instruction dispatching means may be operatively coupled to the scheduling means and may perform said functions according to controls provided by the scheduling means.

In an embodiment, the execution environment may also include at least one execution means, such as execution circuitry co-disposed in an integrated circuit package with the instruction dispatching means, for processing the instructions as dispatched by the instruction dispatching means.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means A or B. The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Certain embodiments may describe methods by reference to flow diagrams to enable one skilled in the art to develop programs including instructions to carry out the methods on suitably configured processing devices, such as a multi-thread processor of a computing device executing the instruction execution threads from machine-accessible media. The computer-executable instructions may be written in a computer programming language or may be embodied in firmware logic. If written in a programming language conforming to a recognized standard, such instructions can be executed on a variety of hardware platforms and for interface to a variety of operating systems, such as multi-thread aware and non-multi-thread operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application . . . ), as taking an action or causing a result. Such expressions are merely a shorthand way of saying that execution of the software by a device causes the processor of the computer to perform an action or produce a result.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
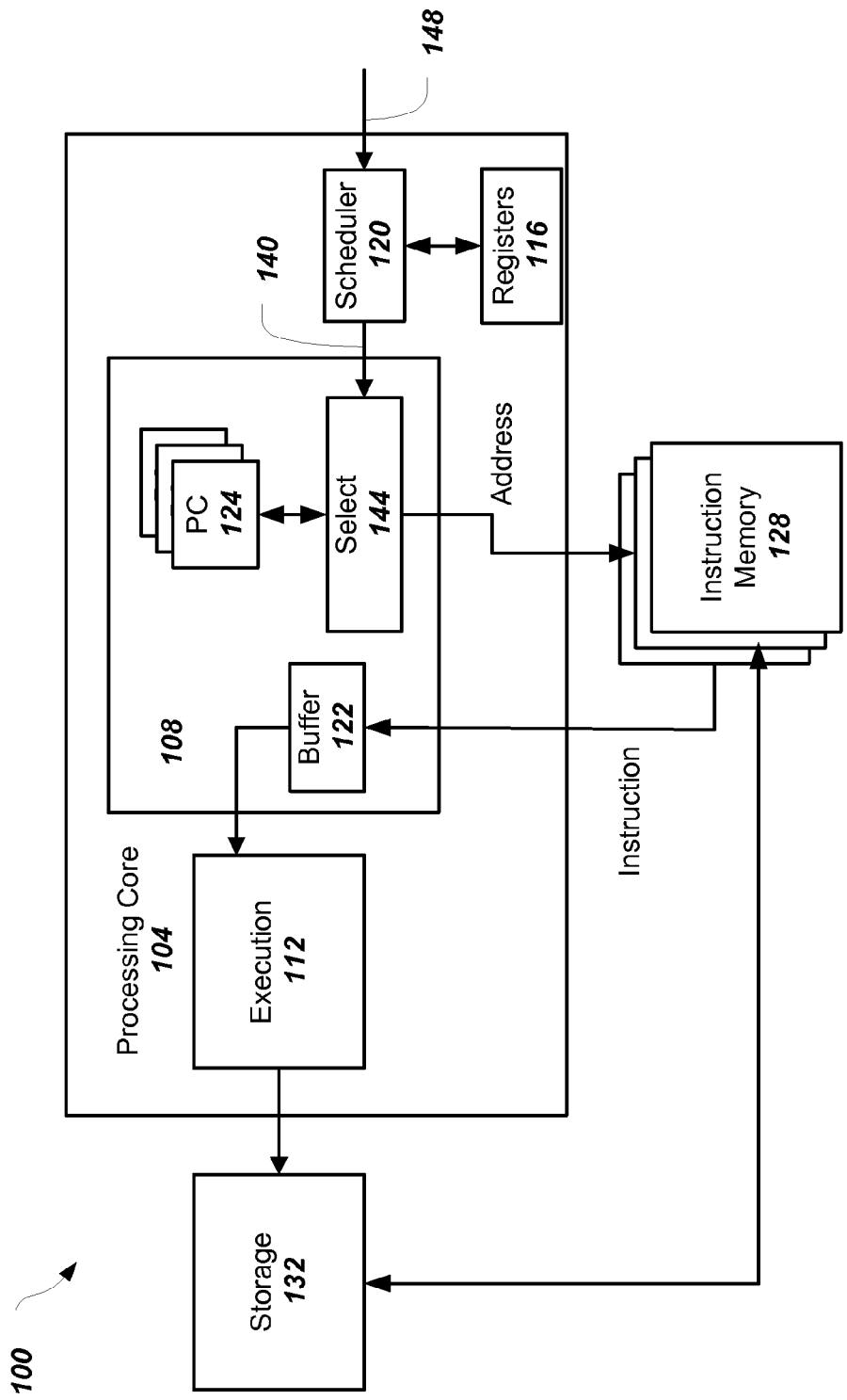
FIG. 1 illustrates a block diagram of an exemplary multi-thread processing environment in accordance with at least one embodiment.

Referring to FIG. 1, a block diagram shows an exemplary multi-thread processing environment 100 having a multi-thread processing core 104 with an instruction dispatcher 108, execution circuitry 112, registers 116, and a scheduler 120 that are coupled to each other at least as shown.

In accordance with various embodiments, the instruction dispatcher 108 (hereinafter "dispatcher 108") may be configured to interleavingly fetch and issue instructions from multiple instruction execution threads for execution by the execution circuitry 112. The fetched and issued instructions may be arranged in a buffer 122 for presentation to the execution circuitry 112. Such a configuration may improve the performance (e.g., per area/power) for a system running multiple tasks simultaneously. In an embodiment, the dispatcher 108 may fetch and issue instructions from at least a first instruction execution thread and a second instruction execution thread, for execution by the execution circuitry 112.

In various embodiments, the dispatcher 108 may provide for a thread switch when changing between instruction execution threads. As such, an instruction from a second thread may be executed immediately after an instruction from a first thread, such that the respective instructions may be executed on subsequent cycles.

The dispatcher 108 may be coupled to the execution circuitry 112 and include at least one program counter 124 for each instruction execution thread to interleave the threads and to switch the processing core 104 between threads by switching which program counter 124 provides the next instruction. Accordingly, switching may associate each thread with a unique allocated program counter 124. In an embodiment, the dispatcher 108 of the processing core 104 may associate a first program counter 124 with the first instruction execution thread and at least one other program counter 124 with each additional instruction execution thread. In an embodiment, each instruction execution thread may have a different program counter 124.

In one embodiment, the dispatcher 108 may alternatively provide switching using dedicated registers of the registers 116 associated with each thread. The dedicated thread registers each being configured to load the address into the program counter 124 of the next instruction to be executed based on which thread is selected next. In various embodiments, at least some of the registers 116 may be coupled directly to the dispatcher 108. The registers 116 may also include the number of cycles a particular thread should be active, as will be discussed in further detail below.

Interleaving fetching and issuance of instructions from multiple currently executed threads using associated program counters is the subject matter of co-pending application Ser. No. 11/775,152, entitled "A Multi-Thread Processor with Multiple Program Counters," contemporaneously filed. The specification of application Ser. No. 11/775,152 is hereby incorporated in its entirety, except for those sections, if any, that are inconsistent with this specification. For further details about a dispatcher (also referred to as a "fetch block 113") that may be similar to dispatcher 108, see application Ser. No. 11/775,152.

The multi-thread processing environment 100 (hereinafter "environment 100") may also illustrate various closely associated system devices, which may be coupled to the processing core 104 including instruction memory 128 and storage 132. In various embodiments, instruction memory 128 may include various memory and/or cache structures configured to store instructions and/or data relating to the various threads in a manner to provide timely responses to fetch requests from the dispatcher 108. In various embodiments, the cache structures may include multiple levels of caches (e.g., L1 and/or L2 cache).

Execution of the thread instructions by the multi-threading processing core 104 (hereinafter "processing core 104") may result in read and/or write operations being performed with respect to the storage 132.

The storage 132 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, storage 132 may comprise other and/or later-developed types of computer-readable memory including electrical, optical, acoustical or other forms of propagated signals (e.g., carrier waves, infrared signals, digital signals). Machine-readable firmware program instructions may be stored in storage 132. In one embodiment, the storage 132 includes any storage medium or machine-accessible medium and/or any storage mechanism that provides (i.e., stores and/or transmits) information in a form readable by a machine (e.g., a computer).

In an embodiment, the scheduler 120 may control the successive fetching and issuing of instructions by the dispatcher 108. More specifically, in at least one embodiment, the scheduler 120 may output a thread selection signal along a select line 140 to the dispatcher 108, and to the select circuitry 144 in particular, to control the successive fetching and issuing of instructions by the dispatcher 108.

The scheduler 120, by controlling the successive fetching and issuing of instructions by the dispatcher 108, may determine the execution cycle allocation for the instruction execution period for each of the plurality of instruction execution threads. More specifically, in at least one embodiment, the scheduler 120 may detect an event on one or more allocation inputs 148 to control allocation of a plurality of execution cycles of an execution instruction period to the plurality of instruction threads. The scheduler 120, upon detecting an event on the allocation inputs 148, may determine an allocation mode of the environment 100 as will be described in further detail below.

In various embodiments, the scheduler 120 may determine the allocation mode by referencing a bandwidth allocation table stored in the registers 116. The bandwidth allocation table may include a number of allocation modes corresponding to various detected events. Embodiments illustrating a portion of the operations associated with the scheduler 120 are presented in FIGS. 5 and 7 in further detail.

While the embodiment illustrated in FIG. 1 depicts the scheduler 120 as a part of the processing core 104 and coupled to the dispatcher 108 other embodiments may include different configurations. For example, the scheduler 120 may be disposed in another processing core of a chip hosting a processing environment 100 that includes processing core 104, may be disposed within the dispatcher 108, etc. Thus, the scheduler may be part of any block within a System-on-a-chip (SOC) that hosts a central processing unit (CPU) as opposed to being included as part of a processing core 104.

Figure 2:
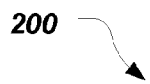
FIG. 2 illustrates a bandwidth allocation table in accordance with various embodiments.

Referring now to FIG. 2, a bandwidth allocation table 200 (hereinafter "table 200") that may be stored in the registers 116 is shown in accordance with various embodiments. The table 200 may govern how the scheduler 120 determines the allocation of processing cycles to the various threads. In particular, the table 200 may include a number of allocation modes that provide for different allocations of the processing cycles among the processing threads. In an embodiment, the table 200 may have a default allocation mode, e.g., NORMAL mode, which may be used in regular operation, and one or more alternative modes. Those skilled in the art will understand that the table 200 may be stored somewhere other than registers 116, either within processing environment 100 or external therefrom.

In the NORMAL mode, bandwidth allocation may be determined by referencing relative bandwidth request (RBR) values provided by, e.g., bits [23:16] in each thread's respective control register. These values may be changed through software instructions (e.g., master control register (MCR) instructions) at runtime.

As shown, the table 200 may also include two alternative modes, e.g., ALLOCATION1 and ALLOCATION2. While two alternative modes are shown in table 200, other embodiments may have more or less alternative modes. Each of the alternative allocation modes may include, e.g., an 8-bit value defining an RBR for each of the threads. These RBRs may be programmed through software instructions during initial configuration of the environment 100 and/or may be set to take certain default values on reset. The default values may be set before synthesis and may depend on a particular application. In an embodiment, the RBR values of the alternative allocation modes may be static once programmed.

The scheduler 120 may switch between the allocation modes found in the table 200 upon detection of an event on the allocation inputs 148. For example, upon detection of an event associated with the ALLOCATION1 mode, the scheduler 120 may switch from the NORMAL mode to the ALLOCATION1 mode and adjust bandwidth allocations according to the corresponding RBR values provided in table 200. The scheduler 120 may detect another event, which indicates that the circumstances prompting ALLOCATION1 are no longer present, and may quickly change back to the NORMAL mode.

In various embodiments, an event may be a hardware event and/or an instruction provided on the allocation inputs 148. In an embodiment where the event is a hardware event originating from outside of the processing core 104 (which may also be referred to as an "external hardware event"), each of the alternative allocation modes may be associated with a corresponding allocation input of the allocation inputs 148. For example, in an embodiment, the allocation inputs 148 may include first and second input pins. The first input pin may be associated with ALLOCATION1 and the second input pin may be associated with ALLOCATION2. When the signal is driven high on either of the input pins, the scheduler 120 may switch into the allocation mode associated with the input pin having the high signal. In an embodiment having multiple alternative allocation modes, e.g., as shown with respect to table 200, various priorities and operating constraints may be assigned to the various modes. Embodiments illustrating alternative allocation modes of varying priorities are presented in FIGS. 7 and 8. Those skilled in the art will understand that allocation modes may also be provided via a shared bus and the bus value may be decoded to determine that a certain allocation mode should be used by the scheduler 120.

The capability of the scheduler 120 to switch between allocation modes based on detected events may allow for the environment 100 to quickly adapt to situations calling for more processing resources to be dedicated to one task than others. This may be done without the need for instructions to be issued to change the cycle count for each of the threads individually. Therefore, providing event-based allocation mode switches may potentially increase the response time of an allocation mode switch and may allow for real-time response, as well as make the switch more precise and predictable. Furthermore, event-based allocation mode switches may potentially increase power saving capabilities by more effectively allocating the processing cycles to the processing threads.

Figure 3:
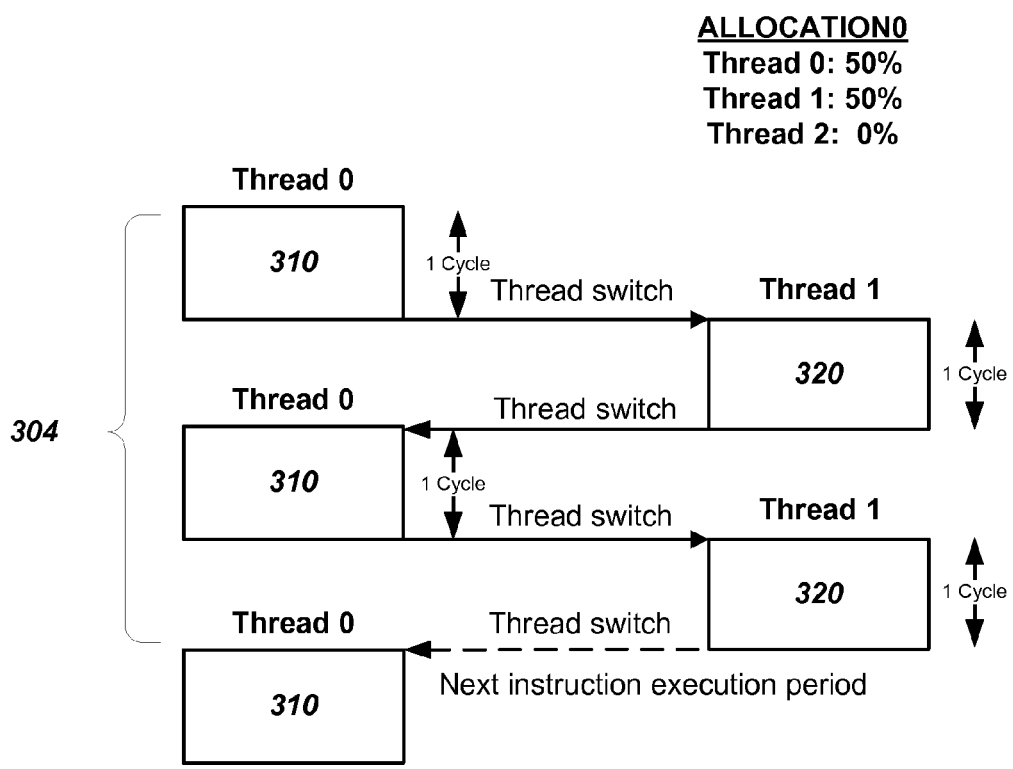
FIG. 3 illustrates threads switching on a multi-thread processor under a default allocation mode in accordance with various embodiments.
Figure 4:
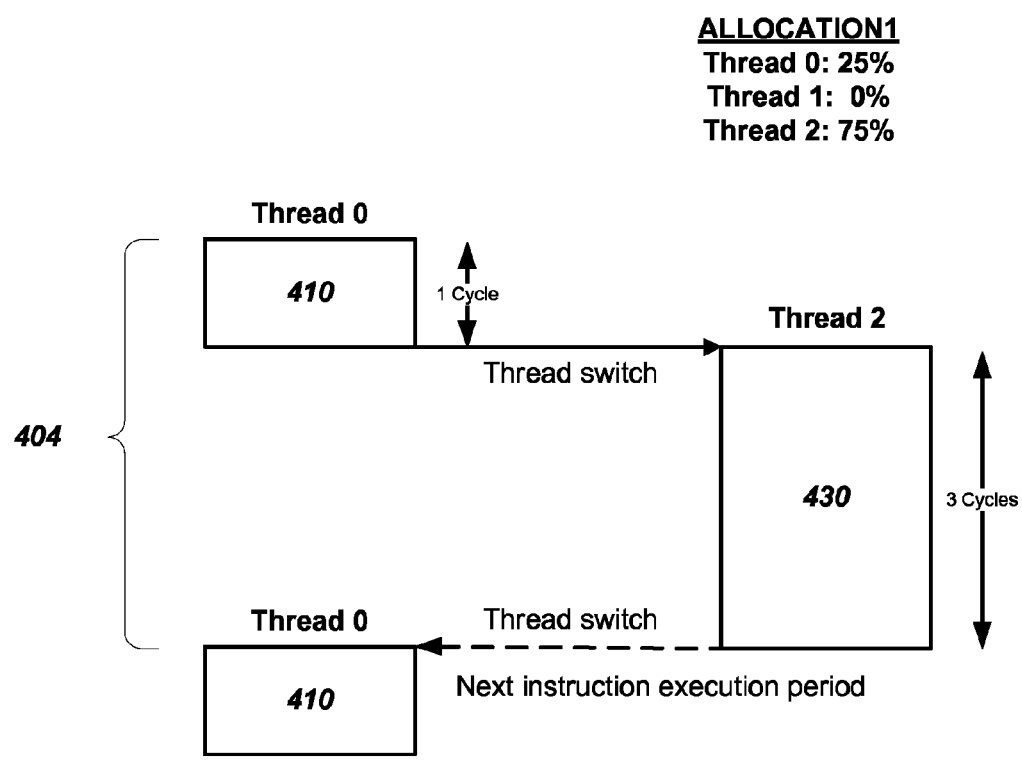
FIG. 4 illustrates threads switching on a multi-thread processor under an alternative allocation mode in accordance with various embodiments.

The efficiencies provided by an event-based allocation mode switch may be useful in a variety of contexts. For example, in an embodiment the environment 100 may have a plurality of interleaved threads corresponding to operations involving components of the storage 132, e.g., a hard disk drive. A first thread may correspond to data operations of the disk drive (e.g., read and write operations) while a second thread may correspond to management operations of the disk drive (e.g., servo controls to the disk drive's motor). While the servo control tasks may occur relatively infrequently, e.g., on the order of once every few microseconds, when it does occur, it may need significant processing resources. Providing processing cycles to the thread that handles the servo control tasks in each instruction period may, therefore, waste processing resources and power, as only part of these cycles will be needed for this task. So, in accordance with an embodiment of this invention, an alternative allocation mode may be customized for a servo control scenario thereby increasing overall efficiency of the environment 100. FIGS. 3 and 4 illustrate such a scenario in accordance with an embodiment of the present invention.

Referring now to FIG. 3, interleaved threads executing in the environment 100 in a NORMAL mode may be shown in accordance with various embodiments. An instruction execution period 304, as shown, may include four execution cycles. The NORMAL mode may allocate fifty percent of the processing resources to Thread 0, fifty percent of the processing resources to Thread 1, and zero percent of the processing resources to Thread 2, which may correspond to servo controls. These allocations may reflect RBR values for each of the threads found in the NORMAL mode in the table 200. According to these values, instructions from the first two threads (Thread 0 and Thread 1) may be separated into multiple execution blocks of equal length for processing by execution circuitry 112. Execution blocks 310 of Thread 0 and execution blocks 320 of Thread 1 may each be one cycle in length.

Upon detection of an event signaling a servo control period, the scheduler 120 may switch into ALLOCATION1 mode. The RBR values of the ALLOCATION1 mode may provide a bandwidth allocation of twenty-five percent to Thread 0, zero percent to Thread 1, and seventy-five percent to Thread 2. Interleaved threads with these allocations may be shown in FIG. 4 in accordance with an embodiment. In particular, an instruction period 404 may be divided up between an execution block 410 of Thread 0, having a length of one cycle, and an execution block 430 of Thread 2, having a length of three cycles. Accordingly this bandwidth allocation may provide the thread handling the servo control tasks, e.g., Thread 2, with the greater amount of processing resources while the environment 100 is in this servo control period. At the conclusion of the servo control period, the scheduler 120 may switch back into the NORMAL mode shown in FIG. 3.

Figure 5:
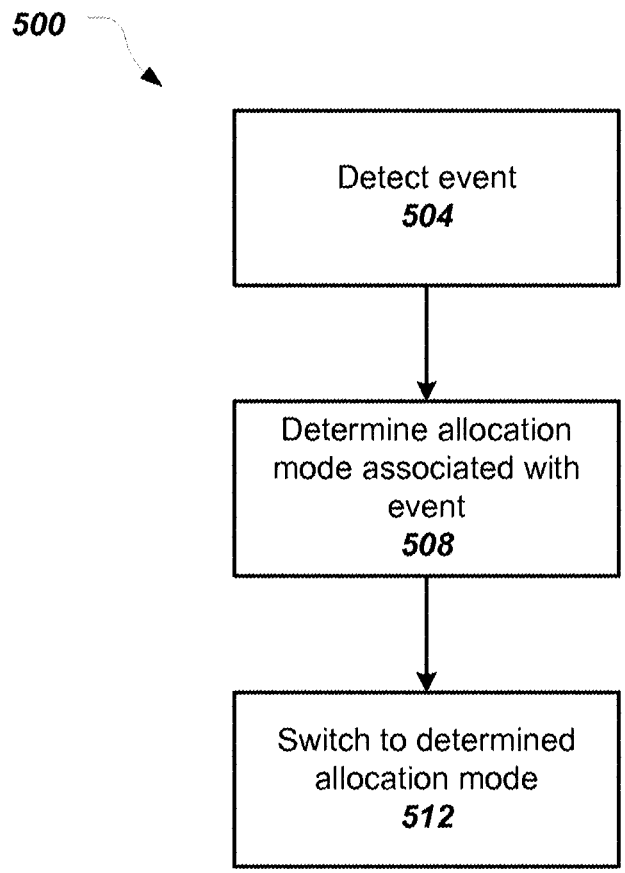
FIG. 5 illustrates a flow diagram of event-based allocation mode switching in accordance with at least one embodiment.

Referring now to FIG. 5, a flow diagram of an event-based allocation mode switch 500 of the scheduler 120 may be shown in accordance with various embodiments. The scheduler 120 may detect an event in block 504. As described above, the detected event may be instructions or an external hardware event. Upon detection of the event, the scheduler 120 may determine an allocation mode associated with the event in block 508. In an embodiment where the event is an external hardware event, the nature of the event (e.g., whether the signal is asserted or de-asserted) and the locality (e.g., which allocation input of a number of allocation inputs on which the signal occurs) may be used to determine the associated allocation mode. Having determined the associated allocation mode, the scheduler 120 may switch to the determined allocation mode in block 512. The scheduler 120 may subsequently control the dispatcher 108 to fetch and issue instructions in accordance with the determined allocation mode.

Figure 6:
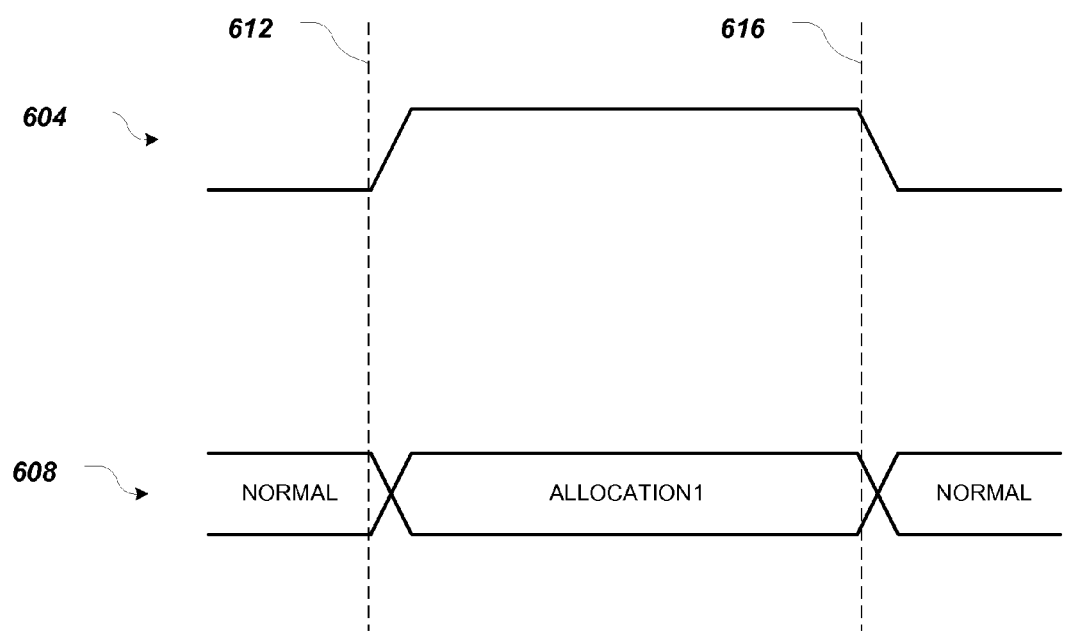
FIG. 6 illustrates an allocation mode relative to input state of an allocation input in accordance with at least one embodiment.

Referring now to FIG. 6, an allocation mode of the scheduler 120 is shown relative to an input state on one of the allocation inputs 148 in accordance with various embodiments. In particular, a signal 604 on an allocation input 148, e.g., an input pin, is shown corresponding to allocation mode 608 of the scheduler 120. While the signal 604 is at a low value, the allocation mode 608 may be in the default, NORMAL mode. At time 612, the signal 604 may be asserted to a high value. Upon detection of this event, the scheduler 120 may implement the allocation mode associated with the allocation input 148, e.g., ALLOCATION1. At time 616, the signal 604 may be de-asserted back to its low value and the scheduler 120 may reinstate the NORMAL mode. Once again, those skilled in the art will understand that allocation modes may also be provided via a shared bus and the bus value may be decoded to determine that a certain allocation mode should be used by the scheduler 120.

While FIG. 6 illustrates the signal on the allocation input 148 as being asserted high, other embodiments may include a signal being asserted low.

Figure 7:
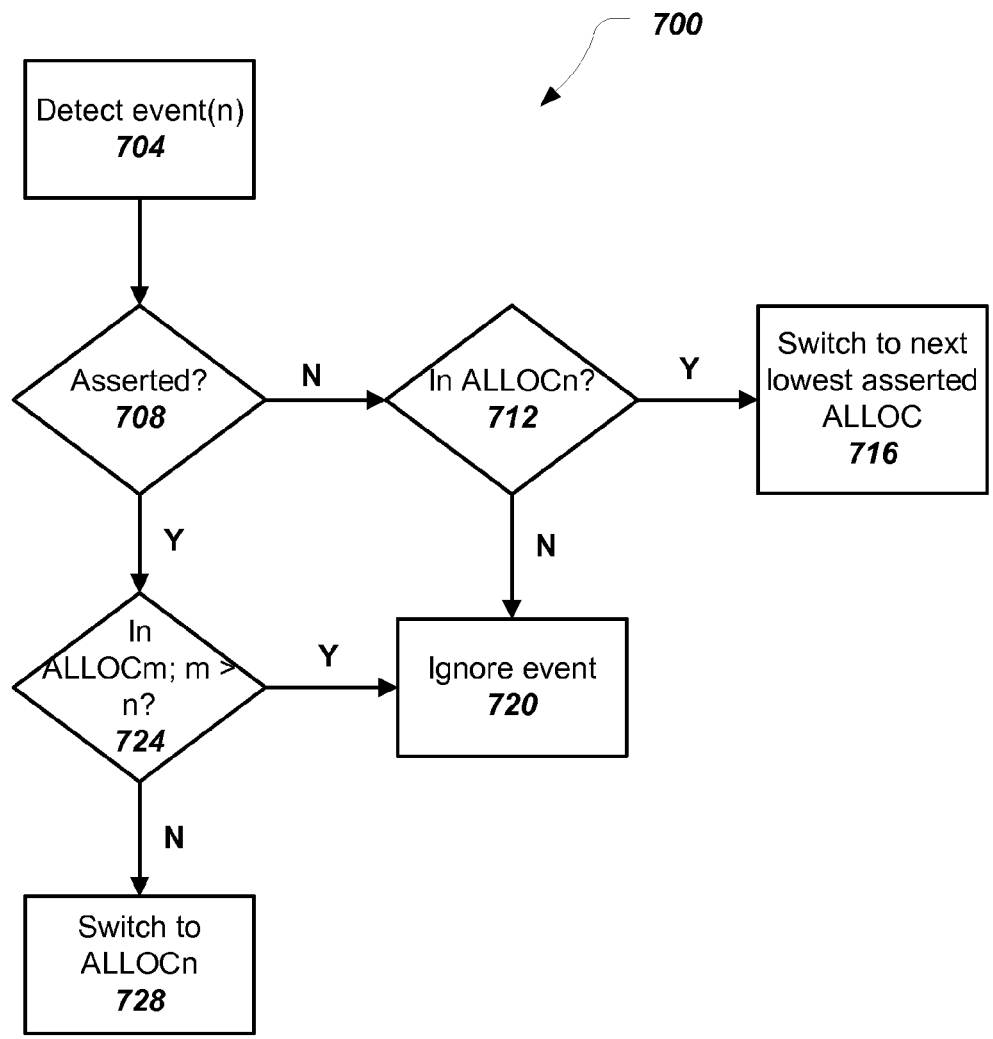
FIG. 7 illustrates a flow diagram of an event-based allocation mode switching with relative allocation mode priorities in accordance with at least one embodiment.

As stated above, in an embodiment having more than one alternative allocation modes, each of the alternative allocation modes may also be associated with relative priorities. Referring now to FIG. 7, a flow diagram illustrating an event-based allocation mode switch 700 of the scheduler 120 taking into account relative priorities of the allocation modes may be shown in accordance with various embodiments. For mode switch 700 the relative priorities of the allocation modes may be proportional to the numerical value of the mode, e.g., ALLOCATION1 has a lower priority than ALLOCATION2, etc. Furthermore, the normal mode may also be considered ALLOCATION0.

In various embodiments, other relative priorities may be established. These relative priorities may be between the various allocation modes and/or events. For example, in an embodiment a hardware event may be given priority over a software event or vice versa.

The scheduler 120 may detect an event, e.g., event(n), that is associated with a particular allocation mode, e.g., ALLOCATIONn, in block 704. The scheduler 120 may determine if the event is a signal being asserted or de-asserted in block 708. If the event is a signal being de-asserted, the scheduler 120 may determine whether it is currently in ALLOCATIONn in block 712. If the scheduler 120 is in ALLOCATIONn, the scheduler 120 may switch to the next lowest asserted allocation mode in block 716. For example, if a de-asserted event(2) occurs, and the scheduler 120 is currently in ALLOCATION2, the scheduler 120 may switch into ALLOCATION1 if this mode is asserted (e.g., event(1) has been asserted and not de-asserted). If ALLOCATION1 is not asserted then the scheduler 120 may switch into ALLOCATION0.

If the event is a de-asserted signal and it is determined that the scheduler 120 is not in ALLOCn in block 712, the event may be ignored in block 720.

If the event is a signal being asserted, determined in block 708, the scheduler 120 may determine whether it is in an allocation mode, e.g., ALLOCm, associated with a higher priority than ALLOCn in block 724. If so, the event may be ignored in block 720. If not, the scheduler 120 may switch into the ALLOCn in block 728.

Figure 8:
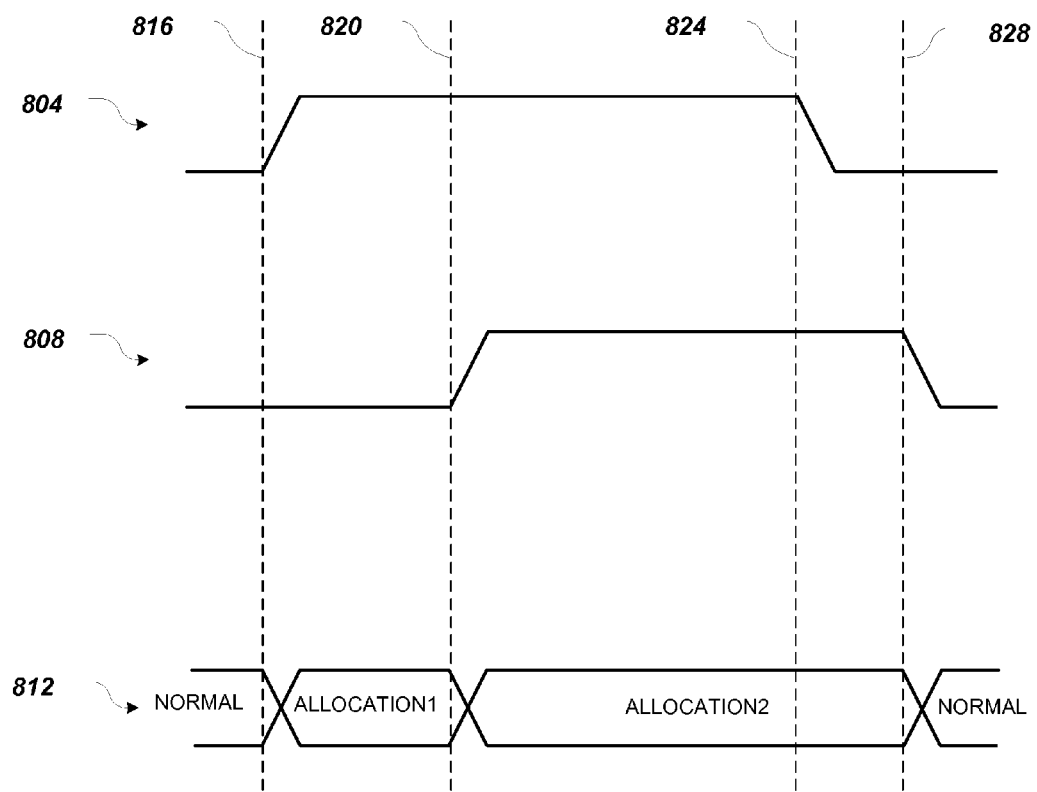
FIG. 8 illustrates an allocation mode relative to input states of allocation inputs in accordance with at least one embodiment.

Referring now to FIG. 8, an allocation mode of the scheduler 120 is shown relative to an input state on two allocation inputs 148 in accordance with various embodiments. In particular, signal 804 on a first one of the allocation inputs 148; signal 808 on a second one of the allocation inputs 148, and the allocation mode 812 of the scheduler 120 may be shown relative to one another.

At time 816, the signal 804 may be asserted and the scheduler 120 may switch from the NORMAL mode to the associated alternative allocation mode, e.g., ALLOCATION1. At time 820, the signal 808, which may be associated with ALLOCATION2, may be asserted. Assuming the same relative priorities introduced in FIG. 7, the ALLOCATION2 may have a higher priority than ALLOCATION1. Accordingly, the scheduler 120 may switch into ALLOCATION2.

At time 824, the signal 804 may be de-asserted. The scheduler 120 may determine that it is no longer in ALLOCATION1 and, consequently, ignore the event. At time 828, the signal 808 may be de-asserted. The scheduler 120 may determine that it is currently in ALLOCATION2 and, consequently, may switch from ALLOCATION2 to the NORMAL mode.

In some embodiments, ignoring a signal being de-asserted may simply mean that the event does not prompt an allocation mode switch. However, the event may be logged and used later in determining whether, upon de-assertion of a relatively higher-priority allocation mode, the relatively lower-priority allocation mode remains asserted. So, for example, had the signal 808 been de-asserted prior to the signal 804 being de-asserted, the allocation mode may have been switched to ALLOCATION1, rather than NORMAL, as ALLOCATION1 had not yet been de-asserted.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method of operating an apparatus in one of at least a first bandwidth allocation mode and a second bandwidth allocation mode, the method comprising:
   while operating in the second bandwidth allocation mode,
      detecting, by a scheduler included in the apparatus, a first event associated with the first bandwidth allocation mode, and
      comparing a priority of the first bandwidth allocation mode with a priority of the second bandwidth allocation mode; and
   based on comparing the priority of the first bandwidth allocation mode with the priority of the second bandwidth allocation mode, either (i) continue operating in the second bandwidth allocation mode or (ii) switching to the first bandwidth allocation mode.

2. The method of claim 1, wherein either (i) continue operating in the second bandwidth allocation mode or (ii) switching to the first bandwidth allocation mode further comprises:
   in response to the priority of the first bandwidth allocation mode being higher than the priority of the second bandwidth allocation mode, switching to the first bandwidth allocation mode.

3. The method of claim 1, wherein either (i) continue operating in the second bandwidth allocation mode or (ii) switching to the first bandwidth allocation mode further comprises:
   in response to the priority of the first bandwidth allocation mode being lower than the priority of the second bandwidth allocation mode, continue operating in the second bandwidth allocation mode.

4. The method of claim 1, further comprising:
   while operating in the first bandwidth allocation mode, detecting a second event associated with the first bandwidth allocation mode, wherein the second event indicates a request to de-assert the first bandwidth allocation mode;
   in response to detecting the second event associated with the first bandwidth allocation mode, detecting that signals corresponding to a plurality of bandwidth allocation modes are asserted;
   comparing relative priorities of each of the plurality of bandwidth allocation modes to select a third bandwidth allocation mode having a highest priority among the plurality of bandwidth allocation modes; and
   in response to (i) detecting the second event associated with the first bandwidth allocation mode and (ii) the third bandwidth allocation mode having the highest priority among the plurality of bandwidth allocation modes, switching from the first bandwidth allocation mode to the third bandwidth allocation mode.

5. The method of claim 1, further comprising:
   while operating in the second bandwidth allocation mode, allocating a plurality of execution cycles of a first instruction execution period of a processor core among a plurality of instruction execution threads based at least in part on the second bandwidth allocation mode.

6. The method of claim 5, further comprising:
fetching and issuing instructions of one or more of the plurality of instruction execution threads according to the allocated plurality of execution cycles.

7. The method of claim 6, further comprising:
executing the fetched and issued instructions.

8. The method of claim 5, wherein detecting the first event comprises:
detecting a hardware event on a first allocation input of one or more allocation inputs of the processor core.

9. The method of claim 1, further comprising:
accessing a bandwidth allocation table having a plurality of bandwidth allocation modes, wherein the plurality of bandwidth allocation modes includes the first bandwidth allocation mode and the second bandwidth allocation mode; and
while operating in the second bandwidth allocation mode, allocating a plurality of execution cycles of a first instruction execution period of a processor core among a plurality of instruction execution threads based at least in part on the second bandwidth allocation mode.

10. An apparatus configured to operate in one of at least a first bandwidth allocation mode and a second bandwidth allocation mode, the apparatus comprising:
a processor core;
a scheduler configured to
while operating in the second bandwidth allocation mode, (i) detect a first event associated with the first bandwidth allocation mode, and (ii) compare a priority of the first bandwidth allocation mode with a priority of the second bandwidth allocation mode, and
based on comparing the priority of the first bandwidth allocation mode with the priority of the second bandwidth allocation mode, either (i) continue operating in the second bandwidth allocation mode or (ii) switch to the first bandwidth allocation mode.

11. The apparatus of claim 10, wherein the scheduler is further configured to:
in response to the priority of the first bandwidth allocation mode being higher than the priority of the second bandwidth allocation mode, switch to the first bandwidth allocation mode.

12. The apparatus of claim 10, wherein the scheduler is further configured to:
in response to the priority of the first bandwidth allocation mode being lower than the priority of the second bandwidth allocation mode, continue operating in the second bandwidth allocation mode.

13. The apparatus of claim 10, wherein the scheduler is further configured to:
while operating in the first bandwidth allocation mode, detect a second event associated with the first bandwidth allocation mode, wherein the second event indicates a request to de-assert the first bandwidth allocation mode;
in response to detecting the second event associated with the first bandwidth allocation mode, detect that signals corresponding to a plurality of bandwidth allocation modes are asserted;
compare relative priorities of each of the plurality of bandwidth allocation modes to select a third bandwidth allocation mode having a highest priority among the plurality of bandwidth allocation modes; and
in response to (i) detecting the second event associated with the first bandwidth allocation mode and (ii) the third bandwidth allocation mode having the highest priority among the plurality of bandwidth allocation modes, switch from the first bandwidth allocation mode to the third bandwidth allocation mode.

14. The apparatus of claim 10, wherein the scheduler is further configured to:
while operating in the second bandwidth allocation mode, allocate a plurality of execution cycles of a first instruction execution period of the processor core among a plurality of instruction execution threads based at least in part on the second bandwidth allocation mode.

15. The apparatus of claim 14, further comprising:
an instruction dispatcher configured to fetch and issue instructions of one or more of the plurality of instruction execution threads according to the allocated plurality of execution cycles.

16. The apparatus of claim 15, further comprising:
an execution circuitry configured to execute instructions issued by the instruction dispatcher.

17. The apparatus of claim 10, wherein the scheduler is further configured to:
detect the first event by detecting a hardware event on a first allocation input of one or more allocation inputs of the processor core.

18. The apparatus of claim 10, wherein the apparatus is an integrated circuit.

* * * * *